United States Patent
Li et al.

(10) Patent No.: US 7,809,394 B1
(45) Date of Patent: Oct. 5, 2010

(54) TRANSMIT POWER CONTROL IN A WIRELESS SYSTEM

(75) Inventors: Qinghua Li, Sunnyvale, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1332 days.

(21) Appl. No.: 10/742,011

(22) Filed: Dec. 17, 2003

(51) Int. Cl.
*H04B 7/00* (2006.01)
(52) U.S. Cl. ...................... 455/522; 370/318
(58) Field of Classification Search ............ 455/69, 455/522, 13.4, 407, 408, 421, 25; 370/349, 370/318
See application file for complete search history.

(56) References Cited

U.S. PATENT DOCUMENTS 6,983,167 B2 * 1/2006 Adachi et al. ............... 455/522
2002/0172186 A1 * 11/2002 Larsson ...................... 370/349

* cited by examiner

*Primary Examiner*—Tu X Nguyen
(74) *Attorney, Agent, or Firm*—Grossman, Tucker, Perreault & Pfleger, PLLC

(57) ABSTRACT

Transmit power control techniques are provided for use within a wireless system. The transmit power control techniques may be used in, for example, a wireless network implementing spatial division multiple access (SDMA). In at least one embodiment, a unique transmit power control packet exchange is provided for use in delivering transmit power control information to individual client devices within a network.

34 Claims, 5 Drawing Sheets

TRANSMIT POWER CONTROL IN A WIRELESS SYSTEM

FIELD OF THE INVENTION

The invention relates generally to wireless communications and, more particularly, to transmit power control techniques for use in wireless systems.

DETAILED DESCRIPTION

Figure 1:
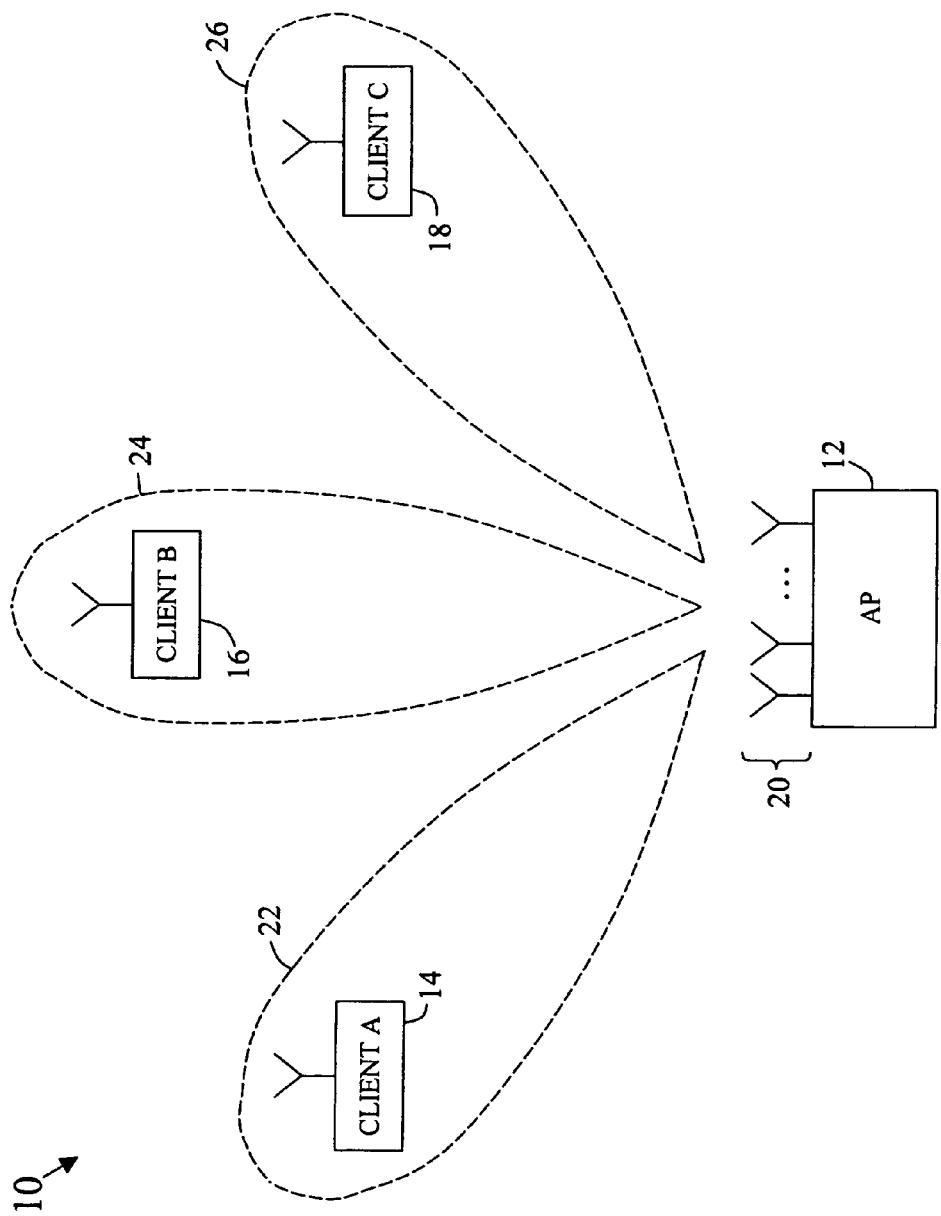
FIG. 1 is a diagram illustrating an example SDMA-based wireless network arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Spatial division multiple access (SDMA) is a multiple access technique that uses spatial separation between antenna beams to allow multiple users to simultaneously use a common wireless communication channel. SDMA techniques may be used by a transmitting device to, for example, increase the number of users that are supported by the device, given a predetermined number of allocated channels. An SDMA transmitter may pre-compensate for the interference between simultaneous users so that each user receives only its intended signal without interference from signals associated with other users. Similarly, when an SDMA-based receiver receives signals from a group of users, the receiver may cancel the interference of other users to detect the individual data associated with each user.

SDMA may be used, for example, to achieve an increase in network throughput in a wireless local area network (WLAN). In such a network, the throughput can be multiplied by nearly the number of antennas used by the wireless access point (AP), without the need for increased spectrum usage. However, in a wireless network implementing SDMA, the uplink from the client devices to the wireless AP may suffer from the near-far problem. This is caused by the large differences in received signal power that may be experienced at the AP in an SDMA-based network. The present invention relates to methods and structures that may be used to implement transmit power control within an SDMA-based wireless network to, among other things, lessen the impact of the near-far problem on network performance. Although developed for use within SDMA-based networks, the transmit power control techniques discussed herein also have application in networks and systems that do not use SDMA.

FIG. 1 is a diagram illustrating an example SDMA-based wireless network arrangement 10 in accordance with an embodiment of the present invention. As illustrated, the wireless network arrangement 10 may include a wireless access point 12 and a number of wireless client devices 14, 16, 18 (CLIENT A, CLIENT B, CLIENT C). Although illustrated with three wireless client devices, it should be appreciated that a wireless AP will typically be capable of servicing any number of client devices, up to a maximum number, at any particular time. The wireless access point 12 may include a plurality of antenna elements 20 for use in maintaining wireless links with each of the wireless client devices 14, 16, 18. As illustrated in FIG. 1, a separate directional antenna beam 22, 24, 26 may be generated by the wireless AP 12 for use in communicating with each of the wireless client devices 14, 16, 18. Because directional antenna beams are used that are spatially separated from one another, the wireless AP 12 may simultaneously transmit signals to and/or receive signals from each of the wireless client devices 14, 16, 18 on the same wireless channel. Any interference between the individual communication links may be dealt with using interference cancellation techniques. If one or more of the wireless client devices 14, 16, 18 is currently in motion, the corresponding antenna beam(s) may be caused to track the changing location of the moving client device(s).

The client devices 14, 16, 18 may include any type of device that is capable of accessing a wireless network including, for example, a desktop, laptop, palmtop, or tablet computer having wireless networking functionality, a personal digital assistant (PDA) having wireless networking functionality, a cellular telephone or other form of handheld wireless communicator, a pager, and/or others. The client devices 14, 16, 18 and the access point 12 may each be configured in accordance with one or more wireless networking standards (e.g., IEEE 802.11 (ANSI/IEEE Std 802.11-1999 Edition and its supplements), Bluetooth (*Specification of the Bluetooth System*, Version 1.2, Bluetooth SIG, Inc., November 2003 and related specifications), IRDA (*Infrared Data Association Serial Infrared Physical Layer Specification*, Version 1.4, May 30, 2001 and related specifications), HomeRF (*HomeRF Specification*, Revision 2.01, The HomeRF Technical Committee, July, 2002 and related specifications), and/or others).

Figure 2:
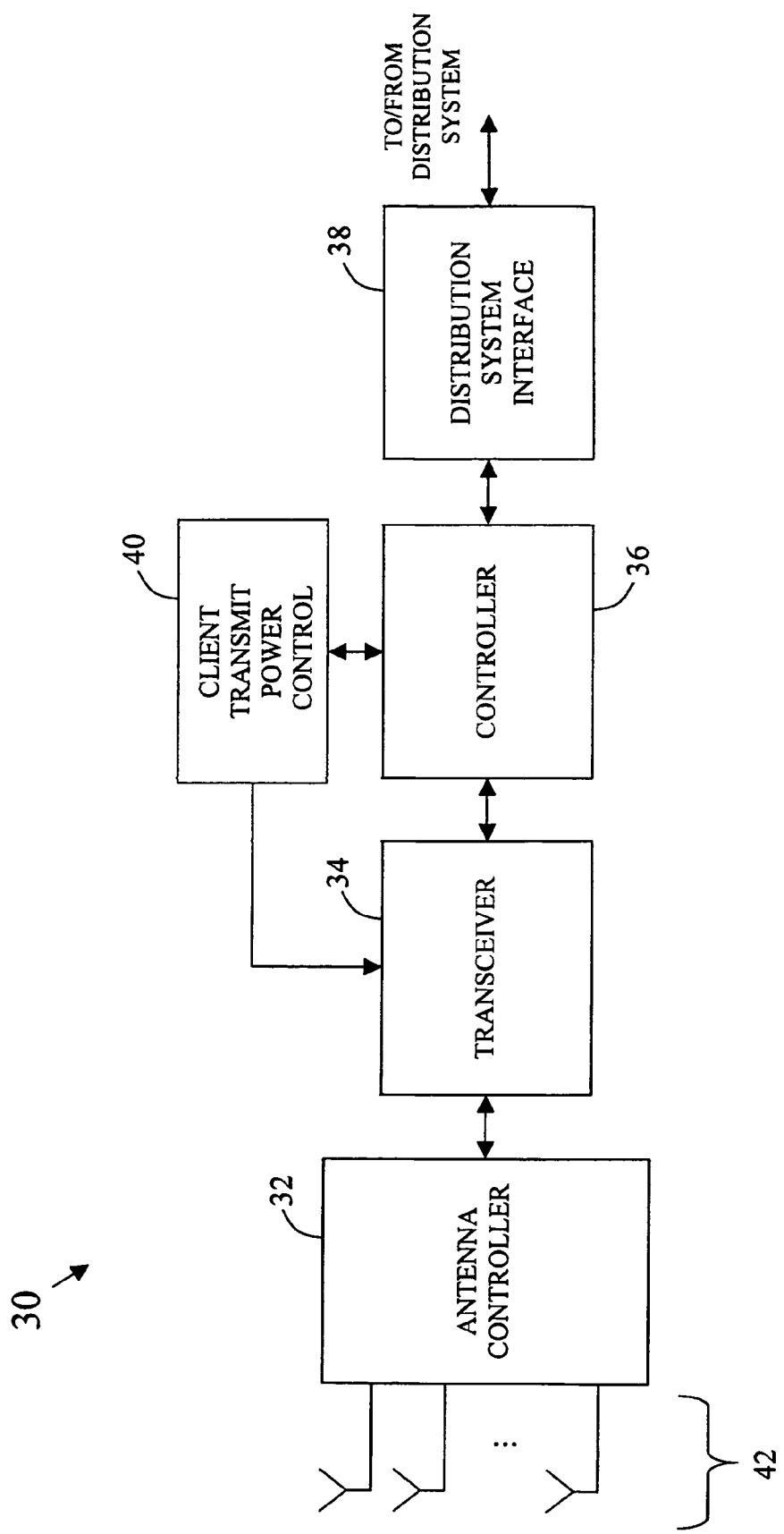
FIG. 2 is a block diagram illustrating an example SDMA-based wireless access point in accordance with an embodiment of the present invention.

FIG. 2 is a block diagram illustrating an example SDMA-based wireless access point (AP) 30 in accordance with an embodiment of the present invention. As illustrated, the wireless AP 30 includes: a plurality of antennas 42, an antenna controller 32, a wireless transceiver 34, a controller 36, a distribution system interface 38, and a client transmit power control unit 40. The antenna controller 32 is operative for managing the creation and maintenance of antenna beams (using the plurality of antennas 42) for use in communicating with individual wireless client devices in the associated network. The wireless transceiver 34 includes receiver functionality for processing signals received by the plurality of antennas 42 and transmitter functionality for processing signals to be transmitted by the plurality of antennas 42. The controller 36 controls the overall operation of the wireless AP 30. The distribution system interface 38 provides an interface between the wireless AP 30 and an external distribution system to allow communication with, for example, another access point, another portion of the same network, another network (e.g., the Internet, the public switched telephone network (PSTN), etc.), and/or others. As will be described in greater detail, the client transmit power control unit 40 may perform transmit power control functions for client devices being serviced by the wireless AP 30.

It should be appreciated that the individual blocks illustrated in FIG. 2 may be functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In at least one embodiment of the present invention, the client transmit power control unit 40 is configured to check a receive power associated with a client device currently communicating with the wireless AP 30 to determine whether the client device should change a current transmit power level. In one possible approach, for example, the client transmit power control unit 40 may determine whether the receive power associated with the client device is within a desired range to ascertain whether a change in transmit power level is needed. If the receive power is within the desired range, the client transmit power control unit 40 will not change the current transmit power level of the client device. If the receive power is not within the desired range, however, the client transmit power control unit 40 may determine that a transmit power level change is needed within the client device and initiate a transmit power control packet exchange with the client device. The receive power level associated with a particular client device may be measured in any known manner. In a wireless network following the IEEE 802.11 standard, for example, the receive power level may be indicated by a measured received signal strength indication (RSSI) value. Other indications of receive power may alternatively be used. In at least one embodiment of the invention, the client transmit power control unit 40 may check the receive power of each client device currently communicating with the AP 30 to determine whether a transmit power control packet exchange should be initiated for that device. Such receive power monitoring may be performed repeatedly during operation of the AP 30 so that enhanced client transmit power levels are maintained in the network.

When the client transmit power control unit 40 determines that a particular client device should change its current transmit power level, it may also determine how the transmit power level of the client device should be changed. The client transmit power control unit 40 may then configure the subsequent transmit power control packet exchange in a manner that is designed to inform the client device how to modify its transmit power. In at least one approach, the client transmit power control unit 40 will cause the wireless transceiver 34 to transmit a first packet to the client device at a first transmit power level and a second packet to the client device at a second transmit power level. After receiving the first and second packets, the client device can then determine how to change its transmit power level based on a comparison between the receive power levels of the two packets. For example, in one approach, the client device may change the magnitude of its current transmit power level based on the magnitude of the difference between the receive powers of the first and second packets (in deciBels or dB). In another approach, the client device may change its current transmit power level based on the "sign" of the difference (in dB) between the receive powers of the packets (i.e., by adding or subtracting a predetermined power increment to/from the current transmit power of the device based on the sign of the difference). Other techniques may alternatively be used. When using the linear scale rather than deciBels, the "difference" described above would be a ratio and the "sign" of the difference refers to whether the ratio is greater than or less than one. As used herein, the terms "difference" and "sign of the difference" are meant to also encompass the corresponding functions in the linear scale.

In an IEEE 802.11 based implementation, the first packet transmitted during the transmit power control packet exchange may be a request-to-send (RTS) packet. The second packet transmitted during the transmit power control packet exchange may be a null packet that is transmitted to the client device in response to a clear-to-send (CTS) packet received from the client device. The client device will transmit the CTS packet to the wireless AP in response to the RTS packet received previously. In the IEEE 802.11 standard, there is no provision for the delivery of a null packet after an RTS/CTS exchange. In at least one embodiment of the present invention, a client device may be configured to recognize an RTS/CTS exchange sequence that includes a null packet as a transmit power control packet exchange. Once recognized as such, the client device can proceed to change its transmit power level based on the receive power levels of the RTS packet and the null packet. The client device may then deliver an acknowledgement (ACK) packet back to the wireless AP 30 at the new transmit power level. After the wireless AP 30 receives the ACK packet, the client transmit power control unit 40 may decide to initiate another transmit power control packet exchange if deemed necessary. Other types of packets and packet exchanges may alternatively be used. In at least one embodiment of the invention, the packets within a transmit power control packet exchange are all transmitted at the lowest data rate supported by the corresponding standard (although other data rates may be used in other embodiments). Also, it is assumed that there will be little or no change in the condition of the channel during the packet exchange.

Figure 3:
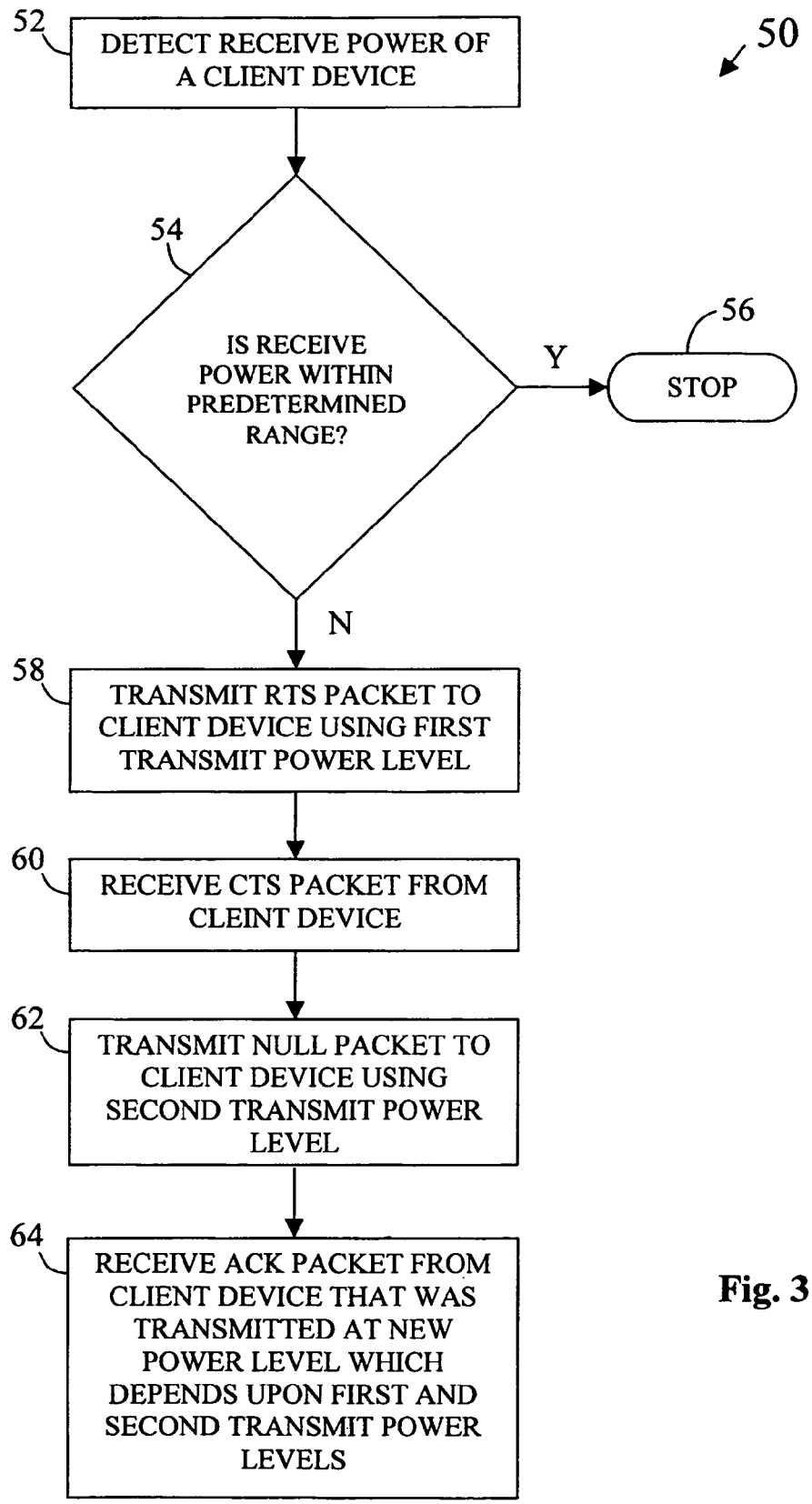
FIG. 3 is a flowchart illustrating an example method for use in providing upstream transmit power control within a wireless network in accordance with an embodiment of the present invention.

FIG. 3 is a flowchart illustrating an example method 50 for use in providing upstream transmit power control (i.e., from client to AP) within a wireless network in accordance with an embodiment of the present invention. The method 50 may be implemented in connection with the AP 30 of FIG. 2 or other wireless access points. A wireless AP first detects the receive power of a client device (block 52). It is then determined whether the detected receive power falls within a receive power range associated with the client device (block 54). In at least one embodiment, the receive power range may be defined by a nominal receive power value selected for the client device plus and minus a predetermined transmit power control threshold value (i.e., a range bounded by PLevel−TPCThreshold and PLevel+TPCThreshold). Other ranges may alternatively be used. The receive power range that is used may depend upon a number of different factors including, for example, data rate, receiver sensitivity, number of radio frequency chains in the remote client device, and/or others.

If the detected receive power falls within the receive power range associated with the client device (block 54-Y), then the method terminates (block 56). If, however, the detected receive power falls outside of the receive power range (block 54-N), then a transmit power control (TPC) packet exchange may be initiated by the AP. The AP first transmits a request-to-send (RTS) packet to the client device using a first transmit power level (block 58). The AP then receives a clear-to-send (CTS) packet from the client device (block 60). In response to the CTS packet, the AP transmits a null packet to the client device using a second transmit power level (block 62). The first and second transmit power levels are selected by the AP to indicate to the client device how its transmit power level is to be changed. The AP may then receive an ACK packet transmitted by the client device at the new transmit power level (block 64). If the receive power level of the ACK packet is unsatisfactory, the AP may decide to repeat the transmit power control packet exchange until a satisfactory receive power level is achieved for the client device. Also, if an ACK packet is not received by the AP after the null packet is transmitted, the AP may decide to reinitiate the transmit power control packet exchange.

Figure 4:
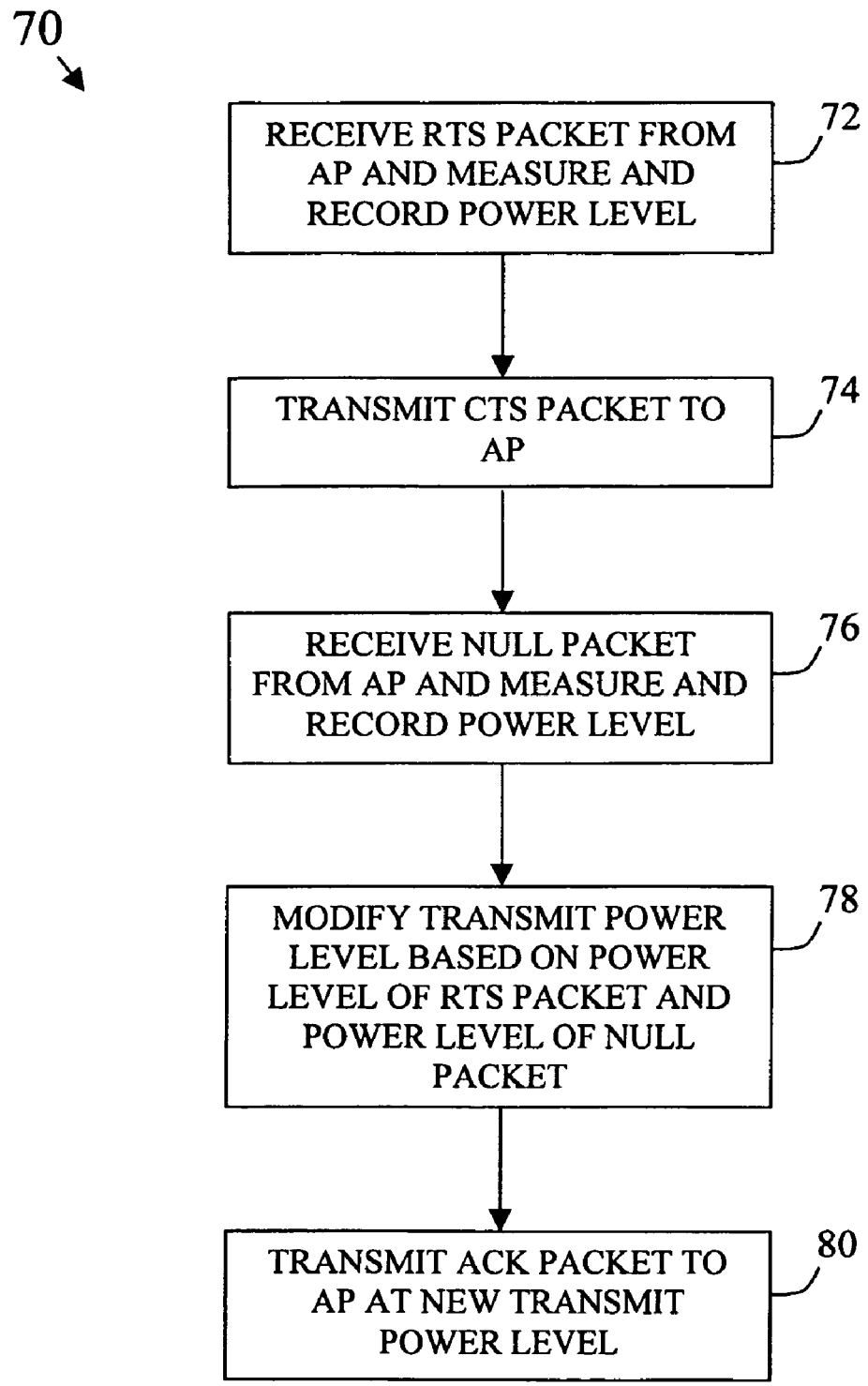
FIG. 4 is a flowchart illustrating an example method for use in providing upstream transmit power control within a wireless network in accordance with another embodiment of the present invention.

FIG. 4 is a flowchart illustrating an example method 70 for use in providing upstream transmit power control within a wireless network in accordance with an embodiment of the present invention. The method 70 may be performed in connection with, for example, a client device within a wireless network. An RTS packet is first received at a client device from a wireless AP and the receive power level of the packet is recorded (block 72). A CTS packet is then transmitted to the AP in response to the RTS packet (block 74). The CTS packet may be transmitted at the present transmit power level of the client device. A null packet is then received at the client device and the receive power level thereof is recorded (block 76). At this point, the client device may recognize that a transmit power control packet exchange is taking place (i.e., because a null packet was received after a CTS/RTS exchange). The client device may then modify its present transmit power level based on the receive power level of the RTS packet and the receive power level of the null packet (block 78). The client device then transmits an ACK packet to the AP at the new transmit power level (block 80).

In one possible transmit power modification approach, the client device may first determine a difference between the receive power level of the RTS packet and the receive power level of the null packet and then modify the present transmit power level based thereon. For example, if the receive power of the RTS packet is −5 dBm and the receive power of the null packet is −10 dBm, then the client device may change its present transmit power level by (−10)−(−5)=−5 dB. Similarly, if the receive power of the RTS packet is −10 dBm and the receive power of the null packet is −5 dBm, then the client device may change its present transmit power level by (−5)−(−10)=+5 dB. In another possible modification approach, the client device may simply determine the direction in which its transmit power level is to be changed from the receive power levels of the two packets and then change the transmit power level by a predetermined increment in that direction. For example, in one implementation, an increment of 2 dB may be defined. Thus, if the receive power of the RTS packet is greater than the receive power of the null packet, the client device may increase its transmit power level by 2 dB and if the receive power of the RTS packet is less than the receive power of the null packet, the client device may decrease its transmit power level by 2 dB (or vice versa). Other modification techniques may alternatively be used.

In at least one embodiment of the present invention, a transmit power control packet exchange is initiated within a client device. A client device may measure, for example, the receive power level of a beacon signal transmitted by an AP and determine whether its own transmit power level should be changed based thereon (i.e., assuming that the receiver sensitivity of the client device is similar to that of the AP and that the wireless channel between the client and the AP is reciprocal, and any other information related to the uplink/downlink loss budget). If the receive power of the beacon is outside of a predetermined range, the client device may then initiate a transmit power control packet exchange with the AP (e.g., by transmitting a TPC request packet to the AP). The AP may then determine an appropriate transmit power for the client device (e.g., within the client transmit power control unit 40 of the AP 30 of FIG. 2, etc.) and transmit the information back to the client device.

Figure 5:
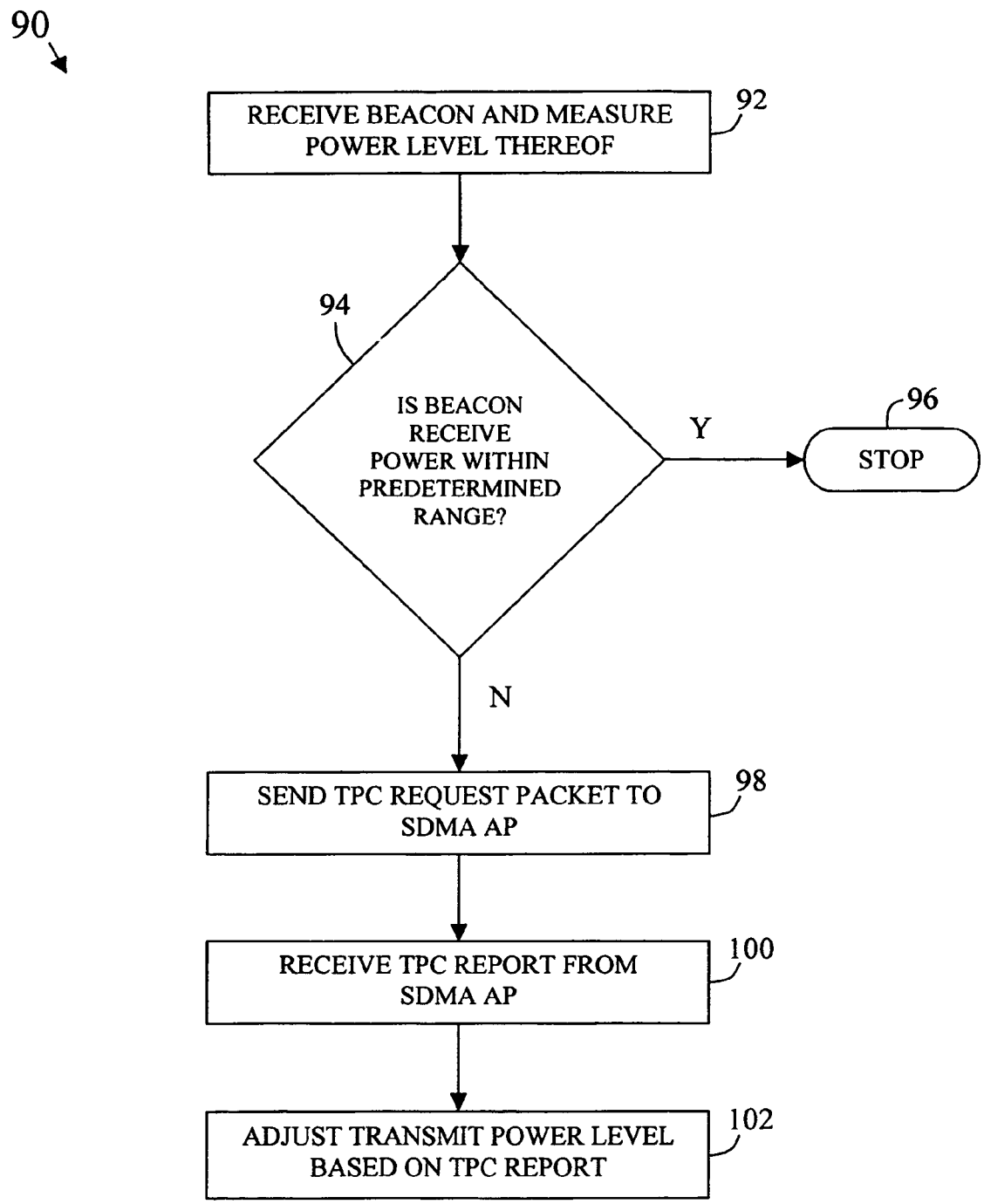
FIG. 5 is a flowchart illustrating an example method for use in performing upstream transmit power control within a wireless network in accordance with still another embodiment of the present invention.

FIG. 5 is a flowchart illustrating an example method 90 for use in performing upstream transmit power control in accordance with an embodiment of the present invention. First, a client device receives a beacon signal that was transmitted by a wireless AP and measures and records a receive power level thereof (block 92). The client device then determines whether the receive power of the beacon is within a predetermined range (block 94). If the receive power of the beacon signal is within the predetermined range, the method 90 is terminated (block 96). If the receive power of the beacon is not within the predetermine range, then the client device may send a TPC request packet to the SDMA-based AP (block 98). The IEEE 802.11h supplement to the IEEE 802.11 standard provides for a TPC request packet that may be used in this regard. The SDMA-based AP receives the TPC request from the client device and proceeds to compute an appropriate transmit power level for the client device. Any number of different factors may be taken into account in determining an appropriate transmit power level for the client device including, for example, the data rate to be used by the client device, the loss in the channel between the client device and the AP, receiver sensitivity, number of radio frequency (RF) chains, and/or others.

After a transmit power level has been determined, the SMDA-based AP sends a TPC report to the client device that includes the computed power level in a transmit power field thereof. A TPC report packet has also been provided for within the IEEE 802.11h supplement and may be used for this purpose. The client device next receives the TPC report (block 100) and extracts the transmit power information from the transmit power field thereof. The client device then adjusts its transmit power level based on the transmit power information (block 102). It should be appreciated that the IEEE 802.11h supplement to the IEEE 802.11 standard uses the TPC request and report packets to achieve the same transmit power level in all client devices (or stations) within a basic service set. In the method 90, however, a different transmit power level may be computed for each client device being serviced by an SDMA AP based on the factors described above. The method 90 may be implemented in networks following IEEE 802.11h or in networks following other wireless networking standards.

In other embodiments of the invention, other transmit power control approaches are used. In one such approach, for example, a bit is reserved in a data packet header (e.g., a PLCP header in a high throughput IEEE 802.11 implementation) for use in upstream transmit power control. If the bit is a one in a packet transmitted from an AP to a particular client, the client may increase its transmit power level by a predetermined amount. Otherwise, the client may decrease its transmit power level by the predetermined amount. In another approach, a multi-bit transmit power control field may be included in a packet to provide more detailed information about the desired transmit level. In still another approach, a unique multicast frame may be defined within a network to multi-cast (or broadcast) the desired transmit power levels of the associated client devices to the client devices. In yet another approach, a field or table may be added to an AP beacon signal to broadcast the desired transmit power levels to the client devices.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless access point (AP) for use in a wireless network, comprising:
   a wireless transceiver to support wireless communication with wireless client devices in a vicinity of the wireless AP; and
   a client transmit power control unit to manage transmit power control activities for wireless client devices, said client transmit power control unit to cause said wireless transceiver to transmit to a first client device, after it is determined that the first client device should change a current transmit power level, a first packet having a first transmit power level and a second packet having a second transmit power level, wherein a difference in decibels between the first transmit power level and the second transmit power level is indicative of a desired transmit power level change in the first client device;
   wherein said desired transmit power level change in the first client device is indicated by a sign of said difference between said first transmit power level and said second transmit power level, wherein said desired transmit power level change is X decibels when said sign is positive and −X decibels when said sign is negative, where X is a predetermined increment or decrement value.

2. The wireless AP of claim 1, further comprising:
   a plurality of antenna elements; and
   an antenna controller to generate multiple independent antenna beams using said plurality of antenna elements, said multiple independent antenna beams for use in communicating with the wireless client devices in the vicinity of the wireless AP.

3. The wireless AP of claim 1, wherein:
   said wireless AP uses spatial division multiple access (SDMA) to communicate with wireless client devices.

4. The wireless AP of claim 1, wherein:
   said wireless AP is configured in accordance with the IEEE 802.11 wireless networking standard; and
   said first packet is a request-to-send (RTS) packet.

5. The wireless AP of claim 4, wherein:
   said second packet is a null packet that is transmitted in response to receipt of a clear-to-send (CTS) packet from said first client device.

6. A method to provide transmit power control comprising:
   determining that a remote client device should modify a present transmit power level;
   transmitting a first packet to the remote client device in response to said determining, said first packet having a first transmit power level; and
   transmitting a second packet to the remote client device after transmitting said first packet, said second packet having a second transmit power level that is different from said first transmit power level, wherein a difference in decibels between said first transmit power level and said second transmit power level is indicative of a desired transmit power level change in the remote client device;
   wherein said desired transmit power level change in the first client device is indicated by a sign of said difference between said first transmit power level and said second transmit power level, wherein said desired transmit power level change is X decibels when said sign is positive and −X decibels when said sign is negative, where X is a predetermined increment or decrement value.

7. The method of claim 6, wherein:
   determining that a remote client device should modify a present transmit power level includes determining that a measured receive power associated with the remote client device is not within a predetermined range.

8. The method of claim 7, wherein:
   said predetermined range depends upon at least one of: data rate, receiver sensitivity, and number of RF chains in the remote client device.

9. The method of claim 7, wherein:
   said method is for use within a wireless network following the IEEE 802.11 standard; and
   said measured receive power includes a received signal strength indication (RSSI) value.

10. The method of claim 6, wherein:
    said method is for use within a wireless network using spatial division multiple access (SDMA); and
    transmitting a first packet includes transmitting a packet to the remote client device within a formed antenna beam dedicated to said remote client device.

11. The method of claim 6, wherein:
    said method is for use within a wireless network following the IEEE 802.11 standard; and
    transmitting a first packet includes transmitting a request-to-send (RTS) packet.

12. The method of claim 11, wherein:
    transmitting a second packet includes transmitting a null packet in response to receipt of a clear-to-send (CTS) packet from said remote client device.

13. A method comprising:
    receiving a first packet from a remote wireless access point at a client device and measuring a received power level thereof;
    receiving a second packet from the remote wireless access point at the client device, after receiving said first packet, and measuring a received power level thereof, said second packet having propagated through substantially the same channel from said remote wireless access point as said first packet; and modifying a transmit power level of the client device based on a difference in decibels between said received power level of said first packet and said received power level of said second packet;

wherein modifying a transmit power level includes determining a sum of said difference and a present transmit power level.

14. The method of claim 13, wherein:

receiving a first packet includes receiving said first packet from a remote wireless access point that uses spatial division multiple access (SDMA).

15. The method of claim 13, wherein:

said method is for use within a wireless network following the IEEE 802.11 standard; and receiving a first packet includes receiving a request-to-send (RTS) packet.

16. The method of claim 15, further comprising:

transmitting a clear-to-send (CTS) packet in response to receiving said RTS packet.

17. The method of claim 16, wherein:

receiving a second packet includes receiving a null packet after transmitting said CTS packet.

18. The method of claim 17, wherein:

modifying a transmit power level includes recognizing that receiving a null packet after receiving an RTS packet signifies a transmit power control operation.

19. A wireless access point (AP) for use in a wireless network, comprising:

at least one dipole antenna;

a wireless transceiver, in communication with said at least one dipole antenna, to support wireless communication with wireless client devices in a vicinity of the wireless AP; and a client transmit power control unit to manage transmit power control activities for wireless client devices, said client transmit power control unit to cause said wireless transceiver to transmit to a first client device, after it is determined that the first client device should change a current transmit power level, a first packet having a first transmit power level and a second packet having a second transmit power level, wherein a difference in decibels between the first transmit power level and the second transmit power level is indicative of a desired transmit power level change in the first client device;

wherein said desired transmit power level change in the first client device is indicated by a sign of said difference between said first transmit power level and said second transmit power level, wherein said desired transmit power level change is X decibels when said sign is positive and −X decibels when said sign is negative, where X is a predetermined increment or decrement value.

20. The wireless AP of claim 19, wherein:

said wireless AP uses spatial division multiple access (SDMA) to communicate with wireless client devices.

21. The wireless AP of claim 19, wherein:

said wireless AP is configured in accordance with the IEEE 802.11 wireless networking standard; and said first packet is a request-to-send (RTS) packet.

22. The wireless AP of claim 21, wherein:

said second packet is a null packet that is transmitted in response to receipt of a clear-to-send (CTS) packet from said first client device.

23. An article comprising a computer readable storage medium having instructions stored thereon that, when executed by a computing platform, result in:

determining that a remote client device should modify a present transmit power level;

transmitting a first packet to the remote client device in response to said determining, said first packet having a first transmit power level; and transmitting a second packet to the remote client device after transmitting said first packet, said second packet having a second transmit power level that is different from the first transmit power level, wherein a difference in decibels between the first transmit power level and the second transmit power level is indicative of a desired transmit power level change in the first client device;

wherein said desired transmit power level change in the first client device is indicated by a sign of said difference between said first transmit power level and said second transmit power level, wherein said desired transmit power level change is X decibels when said sign is positive and −X decibels when said sign is negative, where X is a predetermined increment or decrement value.

24. The article of claim 23, wherein:

said article is for use within a wireless network using spatial division multiple access (SDMA); and transmitting a first packet includes transmitting a packet to the remote client device within an antenna beam dedicated to said remote client device.

25. The article of claim 23, wherein:

said article is for use within a wireless network following the IEEE 802.11 standard; and transmitting a first packet includes transmitting a request-to-send (RTS) packet.

26. The article of claim 25, wherein:

transmitting a second packet includes transmitting a null packet in response to receipt of a clear-to-send (CTS) packet from said remote client device.

27. A method comprising:

receiving an IEEE 802.11h transmit power control (TPC) request packet from a first wireless client device at a wireless access point, said first wireless client device being one of a number of wireless client devices being simultaneously serviced by said wireless access point in a spatial division multiple access (SDMA) mode of operation;

determining a specific transmit power level for the first wireless client device in response to said IEEE 802.11h TPC request packet; and transmitting an IEEE 802.11h TPC report packet to said first wireless client device, said IEEE 802.11h TPC report packet including an indication of said specific transmit power level.

28. The method of claim 27, wherein:

determining a transmit power level includes determining a data rate to be used by said first wireless client device and using said data rate to determine said transmit power level.

29. The method of claim 27, wherein:

said wireless access point uses spatial division multiple access (SDMA) to communicate with wireless client devices.

30. The method of claim 27, further comprising:

receiving a second TPC request packet from a second wireless client device at the wireless access point, said second wireless client device being different from said first wireless client device;

determining a second transmit power level for the second wireless client device in response to said second TPC request packet; and transmitting a second TPC report packet to said second wireless client device, said second TPC report packet including an indication of said second transmit power level.

31. The method of claim 30, wherein:

said second transmit power level is different from said first transmit power level.

32. A method comprising:

receiving a beacon signal at a wireless client device from a remote wireless access point;

measuring a receive power level of said beacon signal and determining whether said receive power level is outside a desired range;

when said receive power level is outside said desired range, sending an IEEE 802.11h transmit power control (TPC) request packet to the remote wireless access point requesting a new transmit power level for said wireless client device;

receiving an IEEE 802.11h TPC report packet from the remote wireless access point that includes transmit power level information generated specifically for the wireless client device; and adjusting a transmit power level of the wireless client device based on said transmit power level information.

33. The method of claim 32, wherein:

determining includes measuring a receive power level of a beacon signal and determining that said receive power level is outside a desired range.

34. The method of claim 32, wherein:

said remote wireless access point uses spatial division multiple access (SDMA) to communicate with wireless client devices.

* * * * *